United States Patent [19]

Markakis

[11] 3,819,024

[45] June 25, 1974

[54] INCREMENTAL MOTION DEVICE

[75] Inventor: Michael J. Markakis, Palo Alto, Calif.

[73] Assignee: SCM Corporation, New York, N.Y.

[22] Filed: Apr. 23, 1973

[21] Appl. No.: 353,305

[52] U.S. Cl. .................................... 197/1 R, 197/19

[51] Int. Cl. .................................................. B41j 5/30

[58] Field of Search ............ 197/1 R, 19; 340/174.1; 346/74, 146.1

[56] References Cited

UNITED STATES PATENTS

| | | | |
|---|---|---|---|
| 2,745,532 | 5/1956 | Crawford | 197/1 R |
| 3,045,218 | 7/1962 | Brand | 340/174.1 |
| 3,164,836 | 1/1965 | Crosman | 346/74 |
| 3,539,723 | 11/1970 | Mattke | 197/1 R |
| 3,719,262 | 3/1973 | Taplin | 197/1 R |

*Primary Examiner*—Robert E. Pulfrey
*Assistant Examiner*—Edward M. Coven
*Attorney, Agent, or Firm*—Armand G. Guibert; Milton M. Wolson

[57] ABSTRACT

A magnetic reader/recorder combined with a typewriter, the recording/reproducing head being mounted on the platen carriage or typehead carrier, but capable of independent substantially constant velocity movement in each character position of a line.

17 Claims, 6 Drawing Figures

INCREMENTAL MOTION DEVICE

BACKGROUND OF THE INVENTION

1. FIELD OF THE INVENTION

The present invention relates generally to a magnetic recording and reproducing device and more particularly to an incremental motion device for magnetic recording and reproducing of data in conjunction with printing data in legible form.

Furthermore, it relates to a magnetic recording device which impresses data coded frequency signals on a magnetic record medium by means of an incremental motion device.

2. DESCRIPTION OF THE PRIOR ART

The magnetic recording and reproducing devices and the printing devices, i.e., a typewriter, of the prior art in the field of data capture have typically been housed in two structurally independent but electronically coupled units. With such arrangement each unit has had to have its own drive means for record stepping, plus means to synchronize the stepping action of each unit in master/slave fashion. This requirement has necessitated the transduction of typewriter carriage and magnetic head motion, has created a sacrifice in overall machine compactness, and magnetic compactness, and has added generally to machine complexity and cost.

It is known in the art to use motion devices such as hammer mechanisms in high speed printing machines for recording of data. None, however, have been used as a means of providing substantially linear motion at a constant velocity and further as a means for providing magnetic incremental recording and reproduction. Use of magnetic members on type bars for producing magnetic records only is known from U.S. Pat. Nos. 2,958,568, 3,450,218, and others, but the same means is not used for reproducing the magnetic records. Accordingly, there is a need in the art for a uniform velocity mechanism for transporting a magnetic head to record and reproduce data over a substantially large portion of a scanned information segment. Furthermore, there is need in the art for an improved technique of recording and reproducing data in a combined printing and magnetic reading/recording machine — such as that described in copending U.S. Pat. application Ser. No. 187,669 filed Oct. 8, 1971, which application is assigned to the same assignee as the instant application, and which discloses a magnetic head mechanically linked to a typewriter carriage, lateral stepping of the carriage causing the magnetic head to be laterally stepped over an adjacently supported magnetic record medium. In the abovementioned application, the actual magnetic recording or impressing of data on the magnetic record medium inherently raises a problem of reliability because of the great variation in packing density in the magnetic record that can be introduced by changes in the carriage motion characteristics from one time to another. Accordingly, there is a need for a carriage-supported magnetic head (or record medium) with motion characteristics independent of carriage travel for greater data reliability.

BRIEF SUMMARY OF THE INVENTION

It is a general object of the present invention to provide an improved magnetic recording and reproducing device.

More specifically, it is an object of the present invention to provide a magnetic recording and reproducing device wherein either a typewriter platen carriage or a print head carrier is linked to it.

Another object of the present invention is to provide a technique for recording and reproducing data by means of an incremental motion device with motion characteristics independent of the travel of a typewriter carriage (or carrier) to which it is linked.

It is a further object of the present invention to provide a magnetic data recording device comprising mobile magnetic recording and reproducing heads which can be thrust forward along a preselected path upon impact by a hammer triggered by action of a key on a keyboard or through other known means.

The foregoing and other objects, features, and advantages of the invention will be apparent from the following more particular description of the preferred embodiment of the invention, as illustrated in the accompanying drawings.

DESCRIPTION OF THE DRAWING

The present invention is described in reference to the accompanying drawings, in which.

GENERAL DESCRIPTION

In the instant invention, there is described a magnetic recording and reproducing coded data mechanism, hereinafter referred to simply as a magnetic recorder, which may be housed in printing machines such as typewriters and which uses a technique for recording or reproducing frequency-coded signals by an incremental motion of the magnetic recording and reproducing heads with substantially uniform velocity independent of the relatively nonuniform transient motions of the typewriter carriage. The principle of this incremental motion device allows use of a greater portion of the travel distance of the typewriter carriage and magnetic device to record and reproduce data.

Figure 1:
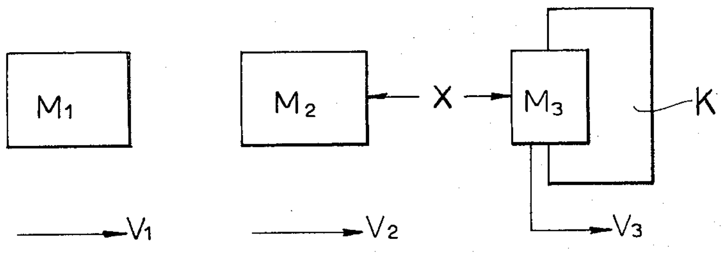
FIG. 1 is a diagrammatical sketch of the basic principle of the invention.

Referring now to FIG. 1, the principle of this mechanism can best be described using masses M1, M2, M3 of equal size, sliding on a frictionless plane. Mass M1 is set in motion to strike mass M2 at an instantaneous velocity V1 upon releasing a cocked spring (not shown in FIG. 1), for example. When mass M1 impacts equal mass M2, the latter moves at a velocity V2 equal to velocity V1. Mass M2, traveling at velocity V2, moves across a distance X and strikes substantially fixed, equal mass M3, which stops mass M2 in place while mass M3 attempts to move at a velocity V3 equal to velocity V2. The energy imparted to mass M3 is absorbed, however, by a damping material K which keeps mass M3 in a relatively fixed position.

The foregoing description of the travel paths and methods of moving masses M1, M2, and M3 is primarily intended to show application of the properties of motion of a mass M2 moving across distance X, when mass M2 becomes a platform containing a transducer for recording or reproducing information in the form of frequency-coded signals. In such an application, the mass M2 would theoretically have the uniform velocity V2 set by choice of velocity V1 at impact. In practice, however, some droop in velocity V2 will occur, the amount depending primarily upon friction between head and magnetic record over the distance X.

Translating the principle described above to recording and reproducing information in practical applications, such as in connection with a typewriter, the mass M2 comprised of the magnetic recording/reproducing head would move at higher and more uniform speed than is provided by the carriage travel, would create a greater read signal output, and would provide a reduction of information packing density within the allocated distance corresponding to a typed character. Furthermore, recording and reproducing would occur prior to carriage motion so that the original typed information and the copy data on the reproduced page would appear in the same carriage location. Thus, an overall improved magnetic reader/recorder rendering greater data reliability and yet enjoying all advantages of standard recording and reproducing systems can be provided.

DESCRIPTION OF THE PREFERRED EMBODIMENT

Figure 2:
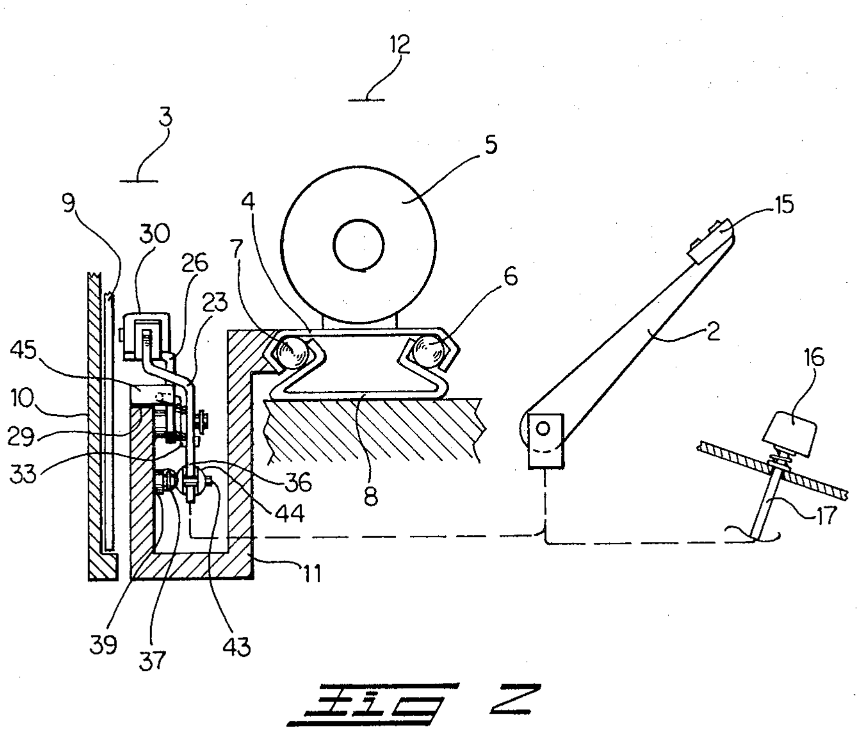
FIG. 2 is a cross-sectional view in schematic showing the magnetic recording and reproducing device of the present invention mounted on a typewriter platen carriage.
Figure 3:
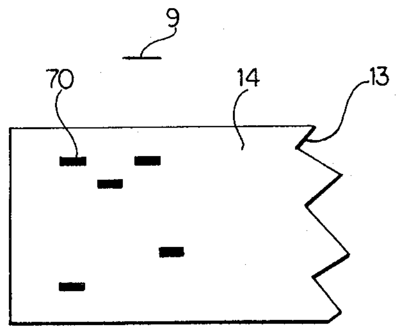
FIG. 3 is a front view of a magnetic record medium, with recorded areas being indicated, as used with the magnetic recording and reproducing device of FIG. 2.

Referring now to FIG. 2, I show a sectional view of a magnetic recording and reproducing device 3 housed together with a conventional typewriter 12. Magnetic reader/recorder 3 is mechanically or physically connected to a carriage 4 as by a platform 11 and moves in a start-stop manner synchronously with carriage 4, as controlled by the depression of a typewriter key 16 which causes a typebar 2 to strike against the platen on carriage 4. After the triggering of typebar 2 and prior to movement of carriage 4 to the next character position, an interponent 26 comprised of a dual winding magnetic recording/reading head 30 forming a major part of magnetic reader/recorder 3 is independently moved to impress a coded signal onto a magnetic record medium 9 held upon a support 10 adjacent head 30. The magnetic record medium 9, as shown in FIG. 3, is comprised of a sheet 13 of suitable nonmagnetic material covered with a magnetic coating 14 in known fashion.

As shown schematically in FIG. 2, when a typewriter key 16 is depressed, a signal coded in accordance with the particular symbol, alphanumeric or function selected, is impressed upon and retained by magnetic record medium 9 (see 70 in FIG. 3) in fashion well known in the art. Selection of the signal corresponding to the typed symbol is accomplished by certain electrical controls, as described below. Likewise, as will be discussed later, upon reproducing of the flux changes 70 from magnetic record medium 9 by a magnetic reproducing winding of head 30, other electrical control circuits are employed to decode the information and thereby control print members to present it legibly to a suitable copy sheet, such being known from prior printing mechanisms (see U.S. Pat. No. 2,939,758, for instance).

MECHANICAL OPERATION

Referring now to FIG. 4, a more detailed view of magnetic reader/recorder 3 is shown in light of a preferred mechanical method of actuating an interponent 26 for movement in an incremental fashion at substantially uniform velocity over the allocated space to impress the previously-mentioned flux changes 70 on record medium 9.

Figure 4B:
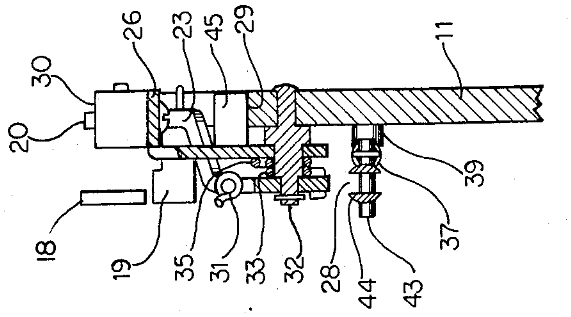
FIGS. 4*a*, *b*, respectively show a schematic front elevation view of the magnetic recording device, including a hammer actuating and cocking mechanism, a mobile magnetic head and its housing, and a backstop which predetermines the incremental distance for recording/-reading of one record area or impression; and a cross-sectional view of the mobile magnetic head and its reset linkage taken at section AA.
Figure 4A:
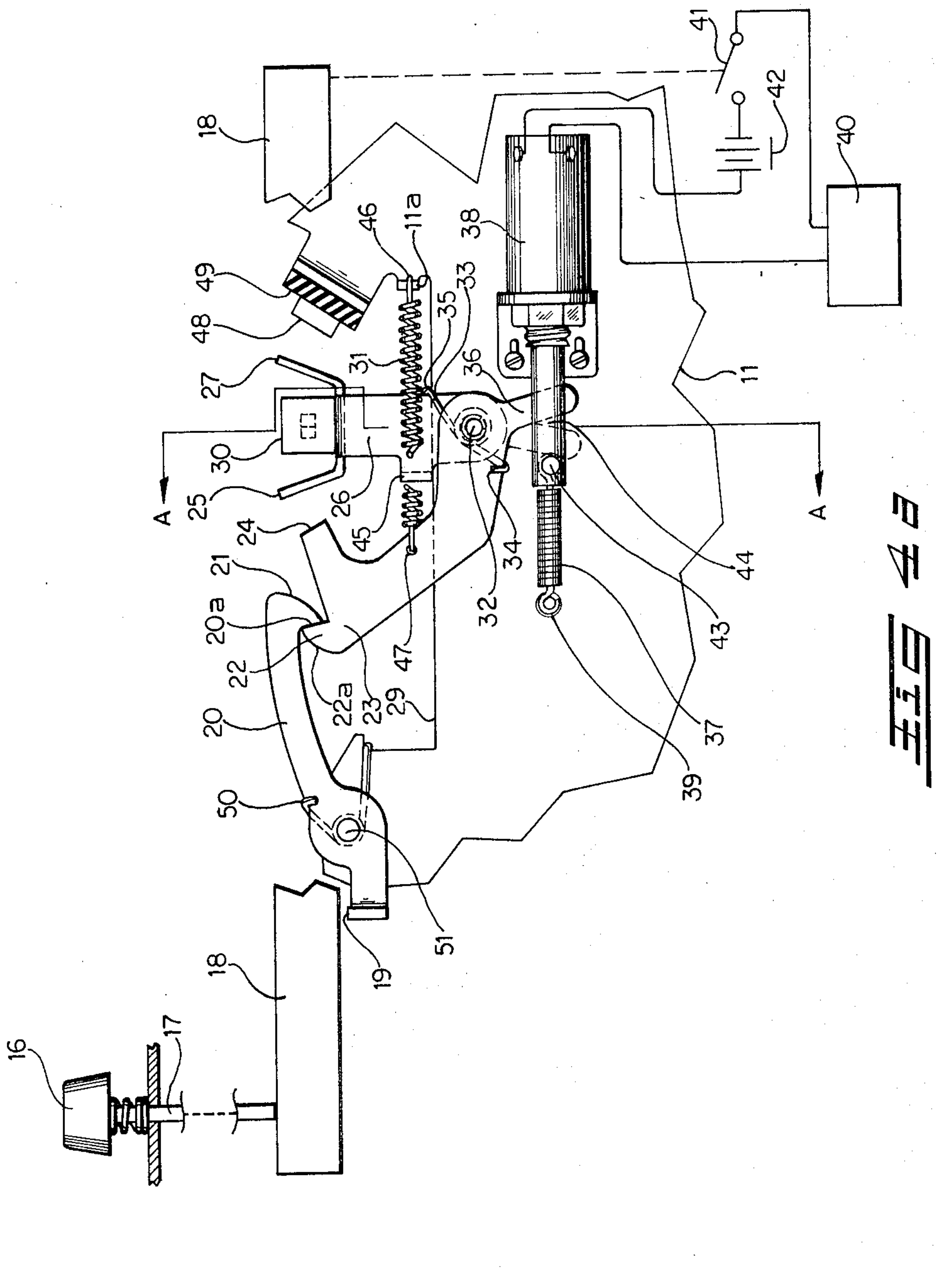

When typewriter key 16 is depressed, a keystem 17 pushes downward (through linkage not shown, but known) upon a hammer release bail 18 which runs through full length of carriage 4, as indicated in FIG. 4*a*. This downward motion of hammer release bail 18 causes a latch 20 to lift up by action of hammer release bail 18 upon a tab 19 forming one end of latch 20, which latch is pivotally mounted on a pin 51. Once a latch surface 20*a* of latch 20 is free of a tooth 22 on a hammer 23, this last is urged rightward (as viewed in FIG. 4*a*) by means of a stressed spring 31 attached at its one end 47 to hammer 23 and at its other end 46 to an ear 11*a* on platform 11. As hammer 23 moves rightward, its impact surface 24 then strikes a surface 25 of interponent 26 at a given instantaneous velocity. Upon striking interponent surface 25, hammer 23 will eventually come to rest and interponent 26 will, in turn, move rightward (as viewed in FIG. 4) at a constant velocity equal to the instantaneous velocity of hammer 23 at the moment of striking interponent 26. At this point, it should be noted that in principle the two masses — hammer 23 and interponent 26 — can be unequal and still provide the essentially constant motion required of interponent 26. Adjustment for a specific velocity of interponent 26 is obtained by proper selection of spring 31 or by provision of means to vary its tension in known fashion.

The distance traveled by interponent 26 is the allocated distance for incrementally impressing recorded binary coded data. Since interponent 26 can be made to travel at a higher and more uniform speed than that of carriage 4, a reduction of information packing density within the allocated, typed-character distance will result; this in turn providing greater data reliability and the higher speed providing for greater signal output upon reading. The distance traveled by interponent 26 must be set at a value less than a maximum determined by and equal to the typed-character distance, to prevent overlap of recorded information. Furthermore, better resolution of and consistency in the recorded signal throughout the length of the incremental recording will be obtained by utilizing a somewhat reduced portion of the typed-character distance to allow for small variations in end point location and also minimize the effect of droop in velocity of interponent 26 which occurs.

In order to limit the distance of travel of interponent 26, a backstop 48 with an energy absorber 49 is provided. Backstop 48 is preferably of mass equal to that of interponent 26, with the result that motion of interponent 26 will end abruptly when a second impact surface 27 on interponent 26 strikes backstop 48. Energy absorber 49 is provided to dissipate the impact energy transferred to backstop 48.

As has been stated before, recording of data coded input signal 70 on medium 9 (see FIG. 3) is done prior to motion of carriage 4. Therefore, during motion of carriage 4, hammer 23 and interponent 26 are restored to their original positions relative to one another, so that recording of the next character can be done in like manner to that described above. At this time, key 16 may still be depressed, but hammer release bail 18 (preferably spring-urged to the rest position shown in FIG. 4*a*) cannot be held down otherwise the resetting action would not be effective because of the releasing position of latch 20. Accordingly, though not shown, the linkage between key 16 and bail 18 must be such as to drive bail 18 downward only momentarily, a single-cycle clutch and a cam being one well-known manner of so doing.

Restoration of hammer 23 and interponent 26 may be performed electromechanically, as shown in FIGS. 4*a* and 4*b* (purely mechanical return methods operated upon the usual leftward stepping of carriage 4 as typebars 2 are raised to cause imprinting would also be possible, as is known in the art). The restoration elements consist of a solenoid 38 operated under control of a power pulse from drive circuits 40 (shown only in block form because these too are well known). Drive circuits 40 may be triggered by closure of a switch 41 connecting a battery 42 across solenoid 38 in series with drive circuits 40. The power pulse supplied to solenoid 38 must be effective only after a time sufficient to allow for completion of the travel of interponent 26, and the duration of the pulse must be sufficient to cause the recocking of hammer 23 and return of interponent 26 to its home position — determined by an ear 45 as will be explained. The drive circuits 40 thus might comprise a known "one-shot" delay multivibrator, for example.

Application of power to solenoid 38 causes a pin 43 in a slotted plunger 44 to bear against a pendant 36 forming part of hammer 23 and located in slot 28 of plunger 44. Pendant 36 is clear of the sides of slot 28 in plunger 44 so that frictional forces there do not impede rapid travel of hammer 23 upon its release. Hammer 23 and its pendant 36 are rotatably mounted on a pivot pin 32. The rightward movement of pendant 36 from the dotted-line position to the solid-line position shown in FIG. 4*a* corresponds to counterclockwise rotation of hammer 23 about pivot 32 to move the released hammer 23 back into a position where a camming surface 21 of latch 20 engages a mating surface **22*a* on tooth 22 and thereby raises latch 20, hammer release bail 18 having sprung back into the up position upon being released, as previously explained. As tooth 22 moves past the tip of camming surface 21 on latch 20, torsion spring 50 will rotate latch 20 clockwise, engaging latch surface 20*a* with tooth 22 of hammer 23** and thus locking the latter in cocked position.

Because of the resilient linkage afforded by a torsion spring 33, return of hammer 23 causes corresponding motion of interponent 26, as will next be described. Spring 33 is wrapped around pivot point 32 and has ends 34 and 35 hooked so as to engage hammer 23 and interponent 26, respectively, as shown in FIG. 4*a*. This engagement occurs only during the last few degrees of the above-mentioned counterclockwise rotation of hammer 23, interponent 26 being otherwise free of hammer 23. As hammer 23 is pushed back into the cocked position shown in FIG. 4*a*, the engagement of ends 34 and 35 of spring 33 with respective surfaces on hammer 23 and interponent 26 forces interponent 26 back into initial position ready for the next incremental marking or recording when a succeeding key 16 is depressed. The initial position of interponent 26 is well defined because its counterclockwise rotation is limited by interaction between ear 45 on interponent 26 and a flat 29 on platform 11, as best seen in FIG. 4*b*.

Upon termination of the pulse to solenoid 38, a spring 37 having one end attached to pin 43 and the other end attached to a stud 39 affixed to platform 11, returns plunger 44 to its rest position, thus permitting renewed travel of cocked hammer 23 upon lifting of the latch 20. Though timing of the pulse to solenoid 38 has been disclosed as occurring with a predetermined delay, it could also be initiated by use of an optical or magnetic sensor giving a signal upon completion of travel of interponent 26, again as is well known.

Upon return of all members to the positions and assuming that carriage 4 has moved into the succeeding character position, magnetic reader/recorder 3 will then be ready to record the next selected character in the same relative location that carriage 4 will next occupy, in manner identical to that described above and as evident in FIG. 2 from the physical connection between carriage 4 and magnetic reader/recorder 3.

As for the mechanical operation for reproducing signals from magnetic record medium 9, the process is the same as described for magnetic recording. The main difference would be in the initiation device whereby recording can be done manually such as by key 16 or automatically as will be described below, but reproducing recorded data from magnetic record medium 9 will be completely automatic once started. This last may be controlled by some electrical means such as a switch or pushbutton provided on the typewriter of the embodiment. Though not shown, such electrical means are well known in the art (control buttons of keyboard 105 of U.S. Pat. No. 3,060,272, for instance).

ELECTRICAL CONTROL OF RECORDING AND REPRODUCING

Figure 5:
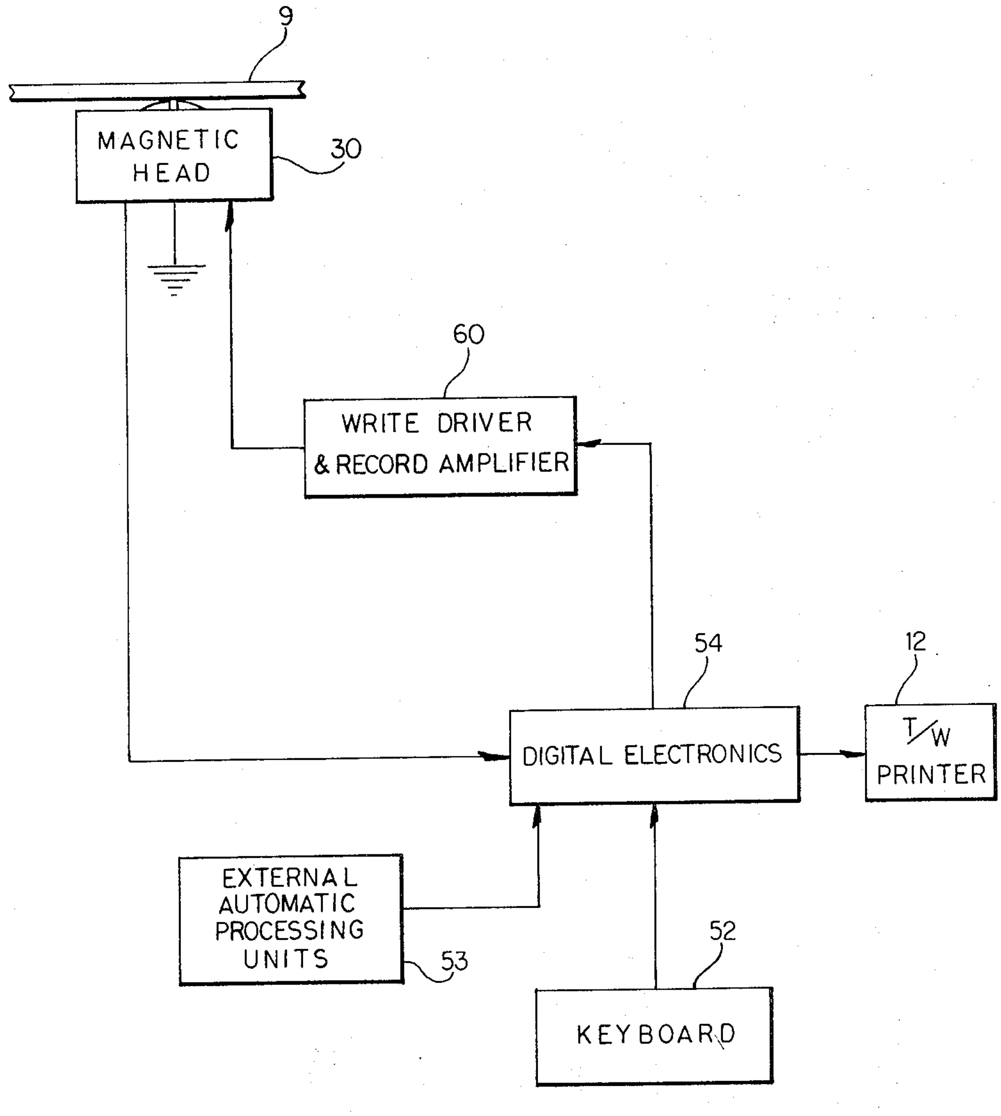
FIG. 5 is a block diagram showing the essential electronics associated with the device of FIG. 2.

As shown in FIG. 5, input signals from the typewriter keyboard 52, or from a remote source extraneous to the machine, such as automatic data processing units 53, may be fed to the digital electronics 54 wherein they are encoded. An encoded signal output is fed to the write driver and record amplifier 60 for recording data through the record winding (not shown) of dual-winding head 30 of FIG. 2, in the form of a coded input signal train by the mobile magnetic recording head incremental method described above, using suitable means (such as the scanned switches described in U.S. Pat. No. 3,060,272, for example) for creating digital signals serially by bits on magnetic record medium 9 positioned adjacent thereto. For reproduction of the coded signals incrementally impressed on magnetic record medium 9, a reproducing winding is also placed on the core of magnetic head 30 in known fashion. The data coded signal impressed on record medium 9 will be sensed by the reproducing winding of head 30, while the latter is moving incrementally along the length of record medium 9, in like manner as during the recording process described above. The serial-by-bit output signal may be captured in a shift register and decoded by a suitable decoding matrix (neither shown, but again one form being known from U.S. Pat. No. 3,060,272) and fed in known fashion to actuating solenoids in the typewriter/printer 12. By these well-known means one may simultaneously make printed and magnetic records of the keyboard input, may edit such records by re-entering corrected keyboard signals, and make further printed records from the edited magnetic records. As previously indicated, one may also make magnetic records from extraneous data sources 53 (such as computers, or magnetic tape records) without necessity of manual input from the keyboard merely by providing an electrical method of releasing latch 20 (refer to FIG. 4*a*) and subsequently operating the letter-spacing mechanism of typewriter 12 for mechanical operation of magnetic reader/recorder 3, as described above.

In summary, I have disclosed a magnetic data recording and reproducing device, housed along with a typewriter as a single unit, wherein typed information may be simultaneously recorded on a suitable magnetic record medium as coded digital input signals and wherein information on the magnetic record medium may be reproduced in a legible form on a copy sheet such as typing paper. According to the invention, the magnetic recording and reproducing device employs a magnetic method utilizing more of the allocated character area on the magnetic record medium by providing a mobile magnetic recording and reproducing head with motion characteristics independent of and faster and more uniform than that provided by carriage travel. The method allows recording and reproduction to occur over a substantially larger portion of the scanned information segment, thus providing greater data reliability.

A particular application of the invention is described in the preferred embodiment, i.e., use in connection with an electric typewriter comprising typebars as print members. It should be noted that this magnetic recording and reproducing device may also be used with typewriters having single element, plural character ball printers, or with any other start/stop devices.

While there have been described and pointed out the fundamental novel features of the invention as applied to a single type of usage and modification, it will be understood that various substitutions and changes in the illustrated form and details of the device and its affiliated components and equipment as well as changes in its operation may be made by those skilled in the art without departing from the spirit of the invention. It is the intention, therefore, to be limited only by the scope of the following claims.

What is claimed is:

1. In office equipment having a base and a carriage steppable with respect to said base, said stepping occurring with relatively nonuniform velocity, the combination of a magnetic head, a magnetic record medium mounted on said base, means affixed to said carriage and supporting said magnetic head for movement between first and second positions thereon, said movement being adajcent to and in parallel relation with said magnetic record medium, means for initiating a step of said carriage, means for moving the magnetic head at substantially uniform velocity from said first to said second position in response to said carriage step initiating means, but prior to stepping movement of the carriage; and means for returning the magnetic head to the first position, said returning means being effective subsequent to arrival of said magnetic head at said second position.

2. The combination of claim 1, wherein said carriage step initiating means comprises a keyboard.

3. The combination of claim 1, wherein said carriage step initiating means comprises a decoder for codes received from remote transmitting devices and further including means responsive to each received code and effective to initiate said carriage step.

4. The combination of claim 1, wherein said uniform velocity means comprises an impact member and said magnetic head supporting means has thereon an impact surface adapted for striking by said impact member.

5. The combination of claim 4, wherein said impact member is a movable hammer normally held in a cocked position and spring-urged from the cocked position toward an impact position; said magnetic head supporting means is an interponent pivotally mounted on said carriage and normally held at said first position, and further including a hammer release operable in response to said initiating means, said hammer impact position and said magnetic head first position being so related as to permit impact between said hammer and said impact surface subsequent to operation of said hammer release.

6. The combination of claim 5, wherein said hammer bears a tooth on a portion thereof and is pivotally mounted on said carriage, and said hammer release comprises a bail operated by said carriage step initiating means and a latch pivotally mounted on said carriage and spring-urged into cooperation with said tooth to hold the hammer in said cocked position, operation of said bail countering the spring-urgence of the latch to thereby raise the latch and release the hammer.

7. The combination of claim 5, wherein said interponent bears another impact surface and further including an energy absorption device at said second position, said device cooperating with said another impact surface to stop abruptly the movement of the magnetic head subsequent to impact by said hammer and upon arrival at said second position.

8. The combination of claim 5, wherein said movable hammer and said interponent are mounted for rotation on a common pivot and further including a stop preventing rotation of said interponent beyond said first position toward said cocked position, and a torsion spring engaging both the hammer and the interponent and being stressed to develop mutual forces urging the hammer and interponent toward one another when these are respectively in said cocked position and said first position, the stress in said torsion spring being such that said mutual forces drop to zero subsequent to operation of said hammer release.

9. The combination of claim 8, wherein said carriage step initiating means comprises a keyboard and bail-operating means responsive to the keys in said keyboard.

10. The combination of claim 8, wherein said carriage step initiating means comprises a decoder for codes received from remote transmitting devices and further including means responsive to each received code and effective to operate said bail.

11. In a magnetic data reading/recording device having a magnetic head cooperating with a record medium, the improvement comprising:

a. a mobile support member for said magnetic head, said member holding said magnetic head for movement adjacent and parallel to said record medium and having thereon an impact surface adapted to be struck by a hammer;
b. means mounting said support member for traversing a preselected path between first and second spaced positions;
c. a mobile hammer disposed for movement along another preselected path between a cocked position and an impact position, said hammer being in contact with said impact surface of said support member when the hammer is located at said impact position and the support member is located at said first position;
d. means for accelerating the hammer from the cocked position to the impact position;
e. means for returning the hammer to the cocked position after the hammer has occupied the impact position; and
f. means for returning the support member to the first position after being struck by said hammer and traversing said preselected path to said second position.

12. The magnetic reading/recording device of claim 11, wherein said hammer accelerating means comprises a spring urging said hammer toward said impact position.

13. The magnetic reading/recording device of claim 11, wherein said device includes a platform, said hammer bears a tooth on a portion thereof and is pivotally mounted on said platform and said hammer release comprises a bail operated by initiating means and a latch pivotally mounted on said platform and spring-urged into cooperation with said tooth to hold the hammer in said cocked position, operation of said bail countering the spring-urgence of the latch to thereby raise the latch and release the hammer.

14. The combination of claim 13, wherein said magnetic head mounting member bears another impact surface and further including an energy absorption device at said second position, said device cooperating with said another impact surface to stop abruptly the movement of the magnetic head subsequent to impact by said hammer and upon arrival at said second position.

15. The combination of claim 13, wherein said movable hammer and said support member are mounted for rotation on a common pivot affixed to said platform and further including a stop preventing rotation of said member beyond said first position toward said cocked position, and a torsion spring engaging both the hammer and the support member and being stressed to develop mutual forces urging the hammer and support member toward one another when these are respectively in said cocked position and in said first position, the stress in said torsion spring being such that said mutual forces drop to zero subsequent to operation of said hammer release.

16. The combination of claim 15, wherein said initiating means comprises a keyboard and a bail-operating means responsive to the keys in said keyboard.

17. The combination of claim 15, wherein said initiating means comprises a decoder for codes received from remote transmitting devices and further including means responsive to each received code and effective to operate said bail.

* * * * *